(12) United States Patent
Franck

(10) Patent No.: US 6,408,799 B1
(45) Date of Patent: Jun. 25, 2002

(54) DOG GUIDE HARNESS WITH MULTI-POSITION HANDLE ASSEMBLY

(75) Inventor: Lukas Franck, Stanhope, NJ (US)

(73) Assignee: The Seeing Eye, Inc., Morristown, NJ (US)

( * ) Notice: Subject to any disclaimer, the term of this patent is extended or adjusted under 35 U.S.C. 154(b) by 0 days.

(21) Appl. No.: 09/808,446

(22) Filed: Mar. 14, 2001

(51) Int. Cl.[7] ............................................... A01K 27/00
(52) U.S. Cl. ........................ 119/793; 119/799; 119/801
(58) Field of Search ................................. 119/793, 792, 119/795, 791, 786, 787, 788, 799, 790, 801, 806, 808, 905, 712; 54/18.1, 25

(56) References Cited

U.S. PATENT DOCUMENTS

| | | | | |
|---|---|---|---|---|
| 602,750 A | * | 4/1898 | Henderson et al. | 119/791 |
| 871,564 A | * | 11/1907 | Brown | 119/786 |
| 901,311 A | * | 10/1908 | Malrmrose | 119/791 |
| 1,482,366 A | * | 1/1924 | Neller | 119/799 |
| 2,275,701 A | * | 3/1942 | Taylor | 119/798 |
| 2,491,951 A | * | 12/1949 | Buettner et al. | 119/676 |
| 2,700,958 A | * | 2/1955 | Taylor | 119/799 |
| 2,713,327 A | * | 7/1955 | West | 119/790 |
| 4,522,153 A | * | 6/1985 | Vander Horst | 119/799 |
| 4,796,566 A | * | 1/1989 | Daniels | 119/789 |
| 5,022,351 A | * | 6/1991 | Daniels | 119/789 |
| 5,732,659 A | * | 3/1998 | Wiggins | 119/787 |
| 5,826,547 A | * | 10/1998 | Gajewska | 119/792 |

* cited by examiner

Primary Examiner—Yvonne R. Abbott
(74) Attorney, Agent, or Firm—Lerner, David, Littenberg, Krumholz & Mentlik, LLP

(57) ABSTRACT

A dog guide harness has, a harness frame and a handle assembly with a self-locking linking member to enable the handle assembly to be rigidly and rotatably connected to the harness frame so the handle assembly selectively can be positioned either transverse or parallel to the longitudinal line of the harness frame. The self-locking linking member includes, a tubular socket or joint, an elongated rod slidably mounted therein and a resilient member to normally maintain these elements in the engaged position. The inner wall on the tubular socket or joint has a predetermined geometric shape and a matching geometric shaped section on the elongated rod can be manually moved into and out of engagement with each other for positioning and repositioning the handle assembly. A safety assembly is provided to prevent inadvertent or accidental separation of these elements from each other.

11 Claims, 4 Drawing Sheets

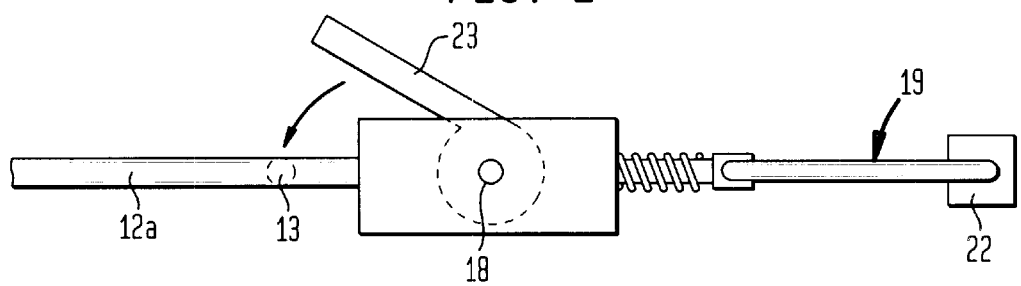
FIG. 2
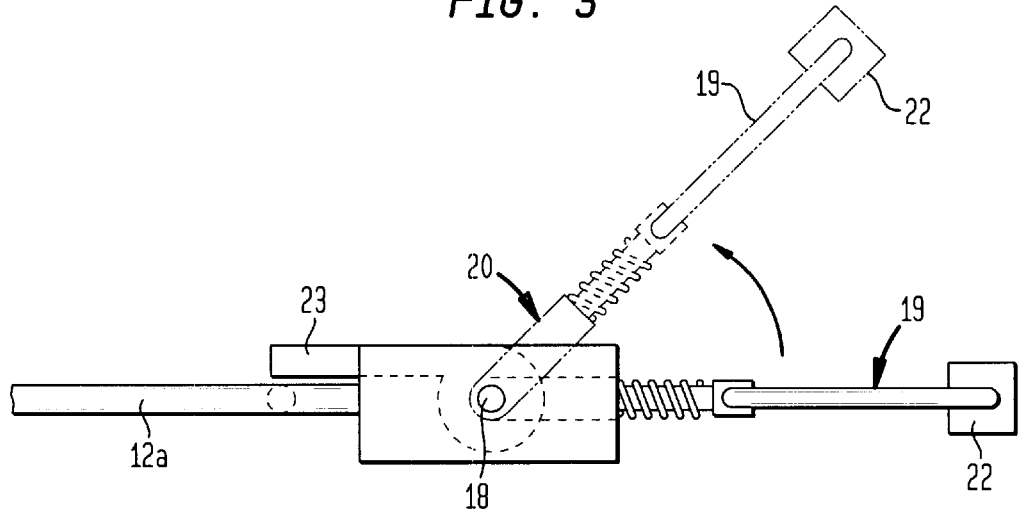
FIG. 3
FIG. 4
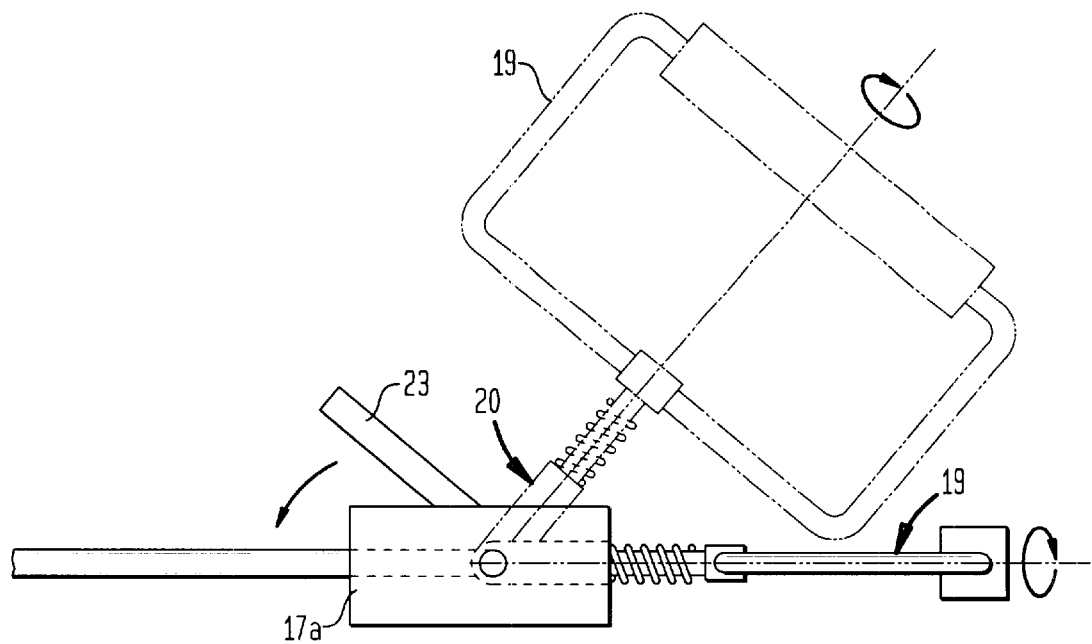

DOG GUIDE HARNESS WITH MULTI-POSITION HANDLE ASSEMBLY

BACKGROUND OF THE INVENTION

The present invention is directed generally to harnesses for dog guides used to assist blind persons and more particularly to providing such dog guide harnesses with an adjustable multi-position handle assembly to reduce the strain on a blind person's hand, wrist, arm and shoulder and to facilitate the operative interrelation with a dog guide by such blind person.

For many years now, dogs have been trained to enhance the independence, dignity and self-confidence of blind persons. These animals effectively serve as a blind person's eyes and as such accompany that person nearly everywhere they go. In order to accomplish this, the dog must not only be well-trained but also must be properly equipped with a generally rigid, sensitive enabling harness and handle assembly so the dog guide can convey signals for guiding the blind person, to enable the blind person and the dog guide to work together as a team. Rigidity of the handle attachment is important because it enables the blind person and the dog guide to receive prompt, efficient feedback from each other.

In the prior art the dog guide harnesses have connecting harness frames for attaching the harnesses to a given dog guide and generally one-piece rigid handles which are disposed transversely of the longitudinal line of the dog guide. These rigid handles have a predetermined length and extend from the harnesses as mounted on a given dog guide so that a blind person can simply reach out and grasp the handle in order to establish communication with the given dog guide.

One of the problems with these prior art harnesses and their rigid, transversely disposed handles is that they require the user to maintain their hand, wrist and arm position in a "knuckle-forward" position. This has been found to be a somewhat uncomfortable position and eventually over time creates shoulder problems, including arthritis, for some of those persons who utilize and rely on their dog guides on a daily basis.

Accordingly, it is desirable to create a dog guide harness with a handle assembly generally rigidly connected thereto which also permits an alternate type of gripping arrangement to enable the user of the dog guide harness to grasp the handle so that the hand, wrist and arm are in a "knuckle-sideways" position, without sacrificing sensitivity required for effective dog guide usage.

Additionally, as in the existing prior art dog guide harnesses, the dog guide harness must also be compact, since dog guides typically accompany their owners in small, cramped spaces such as buses, subway cars, airplanes, restaurants, etc. In this situation, the dogs often must sit under the seat near the owner. Thus, the dog guide harness must still be capable of maintaining a low profile.

The present invention provides an improved dog guide harness which solves the prior art hand, wrist and arm position problem without sacrificing the necessary rigidity between the handle and the harness frame and simultaneously maintains the compactness required for such dog guide harnesses. Thus, in accordance with multiple aspects of the present invention, this is accomplished by providing a dog guide harness having a harness frame with a handle assembly so fixedly connected to the harness frame of the dog guide harness that it can be pivoted along the longitudinal line of the harness frame and dog guide harness and alternatively and selectively disposed in at least two positions, the first transverse to the longitudinal line of the harness frame and dog guide so the hand can be in a "knuckle-forward" position, and the second in generally parallel alignment with the longitudinal line of the harness frame or dog guide so the hand may be in a "knuckle-sidewise" position.

SUMMARY OF THE INVENTION

In accordance with one aspect of the present invention, there is provided a dog guide harness, comprising, a harness frame, a handle assembly including, a self-locking linking means that fixedly, pivotally and rotatably connects the handle assembly to the harness frame. Consistent with this aspect, both the handle assembly and harness frame in assembled position are generally rigid, but the handle assembly can be pivoted a limited amount relative the harness frame and the dog guide harness to obtain the most convenient and comfortable position for the hand, wrist and arm of the blind person using the dog guide.

It is another aspect of the present invention to provide a handle assembly generally rigidly and pivotally connected to the harness frame of a dog guide harness for limited movement along the longitudinal line of the harness frame and the dog guide harness.

It is another aspect of the present invention to provide a handle assembly generally rigidly and pivotally connected to the harness frame of a dog guide harness, including an operatively associated stop means for limiting movement of the handle assembly along the longitudinal line of the harness frame and the dog guide harness.

It is another aspect of the present invention to provide a handle assembly generally rigidly connected to the harness frame for a dog guide harness having a self-locking linking means for alternatively and selectively rotating the handle assembly from a position transverse to the longitudinal line of the harness frame and dog guide harness to any of a plurality of positions including one where the handle assembly is generally parallel or in alignment with the longitudinal line of the harness frame and dog guide harness.

It is another aspect of the present invention to provide a self-locking linking means for generally connecting the handle assembly rigidly, pivotally and rotatably to the harness frame of a dog guide harness which includes, a sized tubular socket or joint having a predetermined internal geometric shape on at least one end, an elongated coacting rod-like or jackshaft member having a mating geometric-shaped means at one end slidably and rotatably mounted in the tubular socket or joint, and said coacting rod-like member or jackshaft end opposite from the mating geometric-shaped end means fixedly connected to the U-shaped handle support and the handle member of the handle assembly, so that resilient means operatively connected between the tubular socket or joint and the elongated rod-like member or jackshaft will normally maintain the self-locking linking means in engaged position and disposed to enable the rod-like member to be moved to a disengaged position so the elongated rod-like member can be changed to a new engaged position with the internal geometric-shaped end in the tubular socket or joint of the self-locking linking means.

It is another aspect of the present invention to provide a safety assembly to prevent the coacting elements of the linking means for connecting the handle assembly to the harness frame from disengaging from each other inadvertently or accidentally during use of the dog guide harness, in accordance with the present invention.

BRIEF DESCRIPTION OF THE DRAWINGS

Other objects, features, aspects and advantages of the present invention, including the basic design and nature of the improvements thereon, will become apparent from the following description taken in conjunction with the accompanying drawings, in which:

FIG. 2 is an enlarged fragmentary side view of the dog guide harness in FIG. 1, showing the handle member of the handle assembly in a transverse or "knuckle-forward" position relative the longitudinal line of the harness frame with a directional arrow to show the limited pivotal movement of the handle assembly due to a stop means.

FIG. 3 is the same enlarged fragmentary side view as in FIG. 2 with the handle assembly now shown in dotted position and in solid lines pivoted to the forward position as limited by the stop means.

FIG. 4 is the same enlarged fragmentary side view as in FIG. 2 with the handle assembly rotated to a position so the handle is now in parallel alignment for the "knuckle-sidewise" position relative the longitudinal line of the harness frame and as shown by the directional arrows.

DETAILED DESCRIPTION

Figure 1:
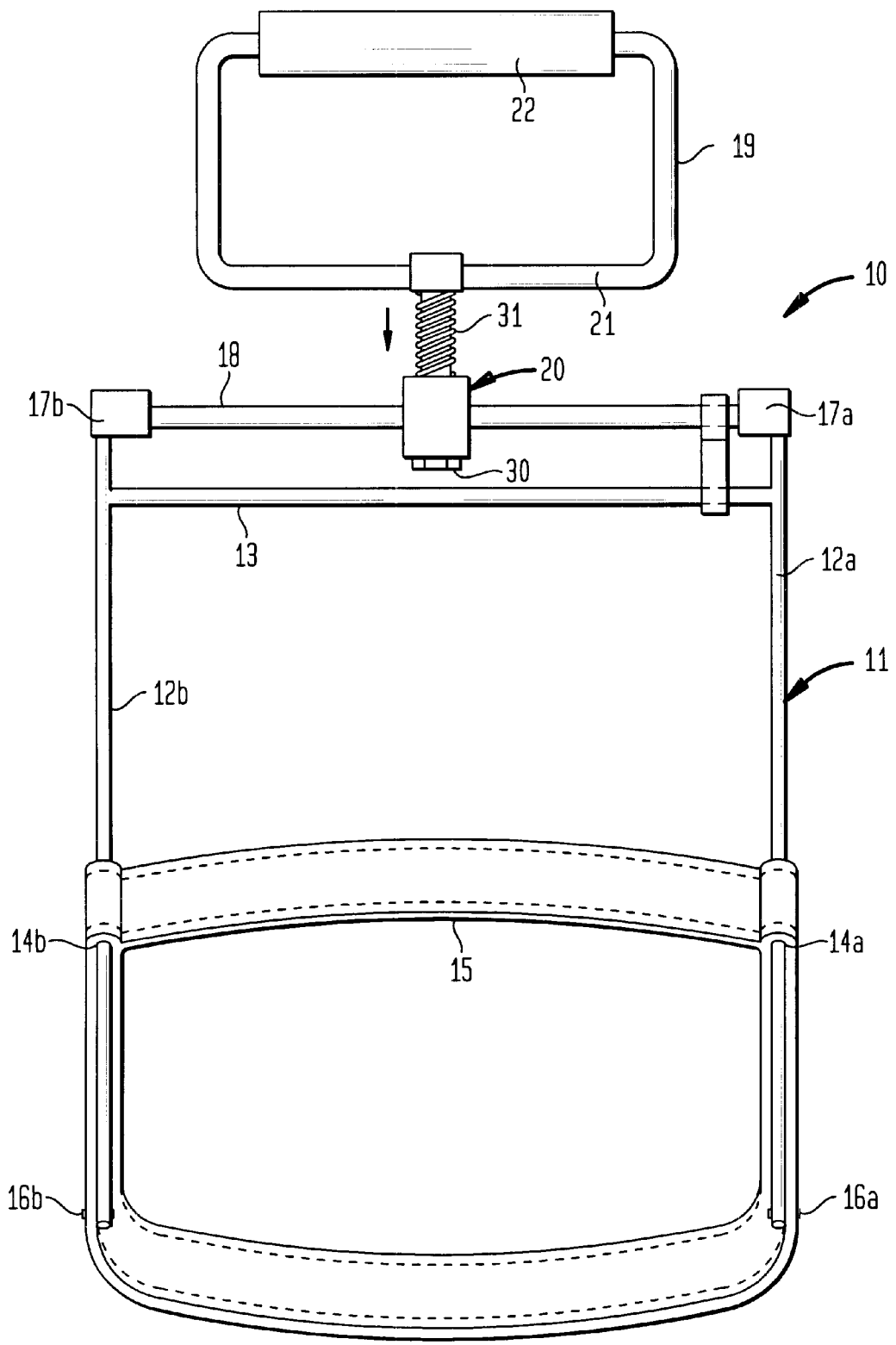
FIG. 1 is a diagrammatic top plan view of a dog guide harness in accordance with the present invention showing the harness frame and operatively associated and connected handle assembly but only a portion of the adjustable strap member for connecting the dog guide harness to any given dog guide.

Referring to the drawings, FIG. 1 shows a dog guide harness generally designated 10 in accordance with the present invention. Dog guide harness 10 has a harness frame generally designated 11 formed by generally parallel support members 12a and 12b held in predetermined spaced relation at one end by a cross-support rod or shaft and stop member 13. The stop function of shaft member 13 is hereinafter more fully described. At the opposite or free end, the respective spaced support members 12a and 12b extend through support arm loops as at 14a and 14b form in the upper section of an adjustable strap assembly 15, only a portion of which is shown, for connecting the harness frame 11 to the given dog guide, and are respectively connected as by rivets 16a and 16b to the forward end of the adjustable strap assembly 15, all of which is shown in FIG. 1 of the drawings. Harnesses for dog guides having harness frames and adjustable strap assemblies are well known in the art and therefor will not be more fully illustrated or described.

FIG. 1 further shows that at the opposite ends outboard of the point where the cross-support and stop member 13 is connected to the respective spaced support members 12a and 12b, and at each respective end, aligned bearings as at 17a and 17b provide means for rotatably mounting a support shaft member 18. A handle assembly generally designated 19 has a self-locking linking means 20 for fixedly and pivotally connecting the handle assembly 19 to the rotatably mounted support shaft 18 on the harness frame 11.

Self-locking linking means 20 is fixedly connected at one end to the medial section of the support shaft 18, and at the opposite end the linking means 20 is fixedly connected to the U-shaped handle support 21 for the handle member 22 on the handle assembly 19 of the dog guide harness 10. Since the support shaft 18 is rotatable and the linking means 20, U-shaped handle support 21 and handle 22 are all fixedly connected to each other, the handle assembly 19 can be pivoted in a forward and backwards direction along the longitudinal line of the harness frame 11 and the dog guide harness 10. However, because the rotatably mounted support shaft 18 has a stop arm 23 having a predetermined length and fixedly connected by any suitable means to the support and stop shaft 18, at a predetermined angle, it pivots on rotation of the support shaft 18, and thus the handle assembly 19 can only pivot in a forward direction until the stop arm 23 comes into contact with the cross-support and stop member 13. The angular position of the stop arm 23 will be adjusted to enable the handle 22 to be brought to an ideal height for use and to prevent the elements of the self-locking linking means 20 from accidentally disengaging during use.

The self-locking linking means 20, in addition to fixedly and pivotally connecting the handle assembly 19 to the rotatably mounted support shaft 18, also includes means to enable the handle assembly to be rotated alternately and selectively between at least two positions, one being where the handle member 22 is disposed transverse to the longitudinal line of the harness frame 11 and dog guide harness 10 so that the hand of the blind person using the guide is in a knuckle-forward position, or another parallel to or in alignment with the longitudinal line of the harness frame 11 and dog guide harness 10 so that the hand of the user is in a knuckle-sidewise position. While only two positions are being illustrated, those skilled in the art will understand that other positions can be obtained by modifying the engaged position of the self-locking linking means 20 now to be described.

Figure 5:
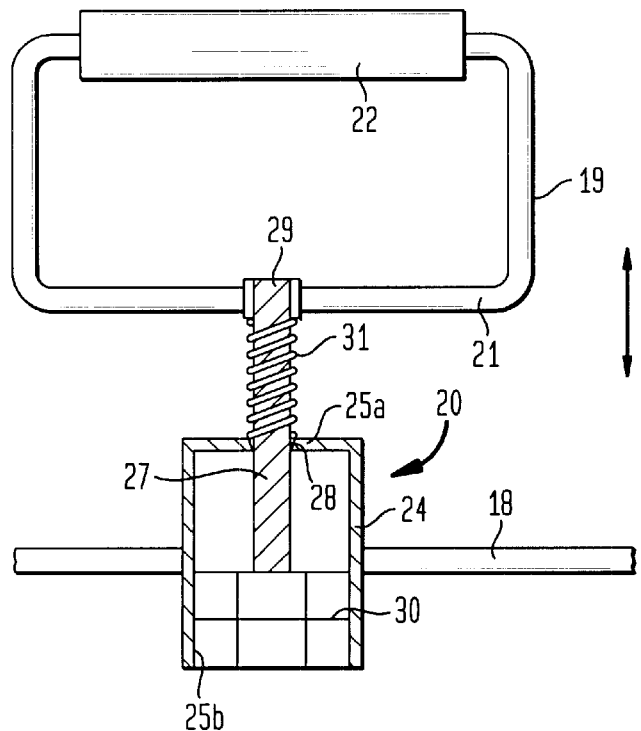
FIG. 5 is a fragmentary top plan view of the handle assembly on the dog guide harness in FIG. 1 showing the self-locking linking means in cross-section with the handle assembly fixedly engaged in the transverse, knuckle-forward, position relative the longitudinal line of the harness frame.
Figure 6:
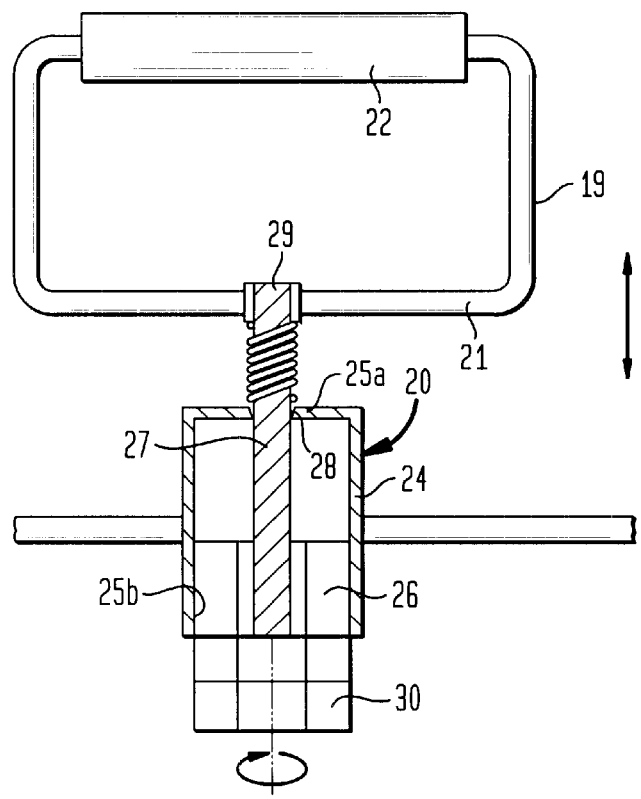
FIG. 6 is the same fragmentary top plan view as shown in FIG. 5 with the handle assembly and the self-locking linking means in the disengaged position to allow the handle of the handle assembly to be alternatively and selectively rotated from the transverse, knuckle-forward position to the parallel aligned knuckle-sidewise position.

Thus, by reference to FIGS. 4, 5 and 6, the self-locking linking means 20 is shown having a tubular socket or joint 24 which is closed as at 25a at the upper end and open as at 25b at the lower or opposite end. Tubular socket or joint 22 has the outer surface fixedly connected by any suitable means such as welding medially along the rotatably mounted support shaft 18. Further, on the portion of the inner surface at about this connected end, the tubular socket or joint 18 has a predetermined geometric shape 26 as a function of the number of relative engaged positions desired for the handle assembly 18. Although a hexagonal shape is illustrated for the form of the embodiment of the invention as shown in FIGS. 1 to 5 of the drawings, those skilled in the art will recognize that any other predetermined geometric shape, such as a square, octagonal, triangular or other shape, may be used, depending on the number of relative different positions other than transverse desired for the handle assembly. Operatively associated with the tubular socket or joint 24 is a coacting elongated rod or jackshaft 27 slidably disposed in a bearing opening 28 in the closed end 25a of the tubular socket or joint 24 so that the elongated rod or jackshaft extends into the tubular socket or joint 24.

The coacting elongated rod or jackshaft 27 is fixedly connected at the outer or exterior end by a cap member 29 to the medial section of the U-shaped handle support 21. At the opposite end, where the elongated rod or jackshaft 27 extends into the tubular socket or joint 24, the elongated rod or jackshaft 27 is formed into a geometric shape by any suitable means such as hexagonal nut members 30, to match the hexagonal shaped inner wall 26 of the tubular socket or joint 24.

Cap 29 also serves to hold one end of a resilient member or coiled spring 31 which is mounted about the elongated rod or jackshaft 27 and disposed between the outer face of the closed end 25a on the tubular socket or joint 24 and the elongated rod or jackshaft 27 so that the geometric shaped inner wall 26 of the tubular socket or joint 24 and the matching geometric shaped members 30 on the inner end of the elongated rod or jackshaft 27 are normally forced into and. maintained in engagement with each other.

However, because the elongated rod or jackshaft 27 is slidably disposed in the tubular socket or joint 24, by pressing or pushing the handle assembly 18 towards the tubular socket or joint 24 so as to force the matching geometric shaped member 30 out through the open end 25b of the tubular socket or joint 24, this matching end member 30 of the elongated rod or jackshaft 27 can be separated and disengaged from the normally engaged position of these coacting members of the self-locking linking means 20. When in this disengaged position, the handle assembly 19 can be rotated to any other desired position of the given geometric shape. When the force or pressure on the handle assembly 19 necessary to separate the elongated rod or jackshaft 27 from the engaged position with the tubular socket or joint 24 is released, the resilient member or spring 31 will again normally cause the matching geometric shaped member 30 on the elongated rod or jackshaft 27 to engage the geometric shaped inner wall 26 on the tubular socket or joint 24 in the new position to which the handle assembly 19 has been rotated, as is indicated by the clockwise and counter-clockwise arrows in FIG. 4 of the drawings.

While the resilient member 31 has been illustrated as a coiled spring, those skilled in the art will readily understand that any type of resilient member may be used without departing from the scope of the present invention. Resilient member 31 must provide adequate force to maintain the matching geometric member 30 and the geometric shaped inner wall 26 in the engaged position. However, the force must be such that it can be overcome by manual pressure on the handle assembly 19. Further, when the manual pressure is released on the handle assembly 19, the force exerted by resilient member 31 must be adequate to return the elongated rod or jackshaft 27 into normal engagement for holding the handle assembly 19 in any newly rotated position.

In operation the dog guide harness 10 is connected to the dog guide, not shown, so the harness frame 11 fits onto the back of the dog guide and is connected to the dog guide by means of the adjustable strap assembly 15.

The handle assembly 19 can be pivoted forward until the stop arm 23 engages the cross-support rod and stop member 13, and the arm will have been adjusted for the proper height for the blind person using the dog guide.

If the handle assembly is not in the desired position for use, the handle assembly can be adjusted by exerting manual pressure on the handle assembly, and when moved to the disengaged position, the handle assembly can be rotated to a new position more convenient for the blind person using the dog guide and the associated dog guide harness 10.

Figure 7:
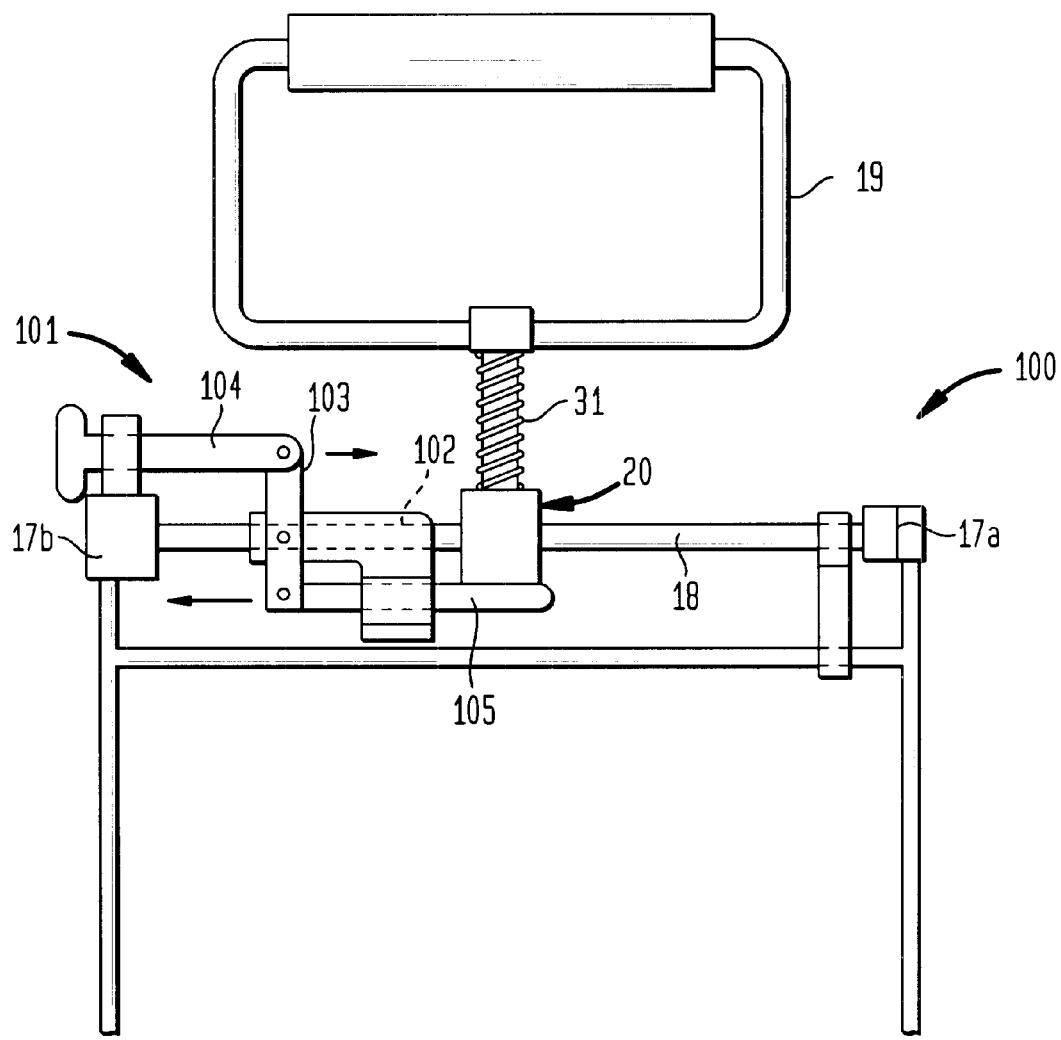
FIG. 7 is an alternate embodiment of the same improved dog guide harness as shown in FIGS. 1 to 6 having a manually operated safety assembly to prevent the handle assembly from accidentally or inadvertently moving from the engaged to the disengaged position during use of the dog guide harness.

FIG. 7 shows another embodiment of the present invention which provides means to prevent inadvertent or accidental disengagement of the elongated rod or jackshaft 27 from the tubular socket or joint 24.

Thus, in this embodiment the dog guide harness generally designated 100 is otherwise identical to that as described for the form of the invention shown in FIGS. 1 to 6 of the drawings and operates in the same way.

In this embodiment, a releasable safety assembly general designated 101 has a support and bearing member as at 102 which is mounted on the rotatable support shaft 18. Pivotally connected to the exterior of the support and bearing member 102 is a crossbar 103. Connected to one end of the crossbar 103 is a manually adjustable push rod 104 which is slidably disposed in the bearing support 17b. Connected to the opposite end of the crossbar 103 is the safety bar 105 which is slidably mounted in the support and bearing member 102. Safety bar 105 extends over the outer or exterior end of the lower opening 25b so that it occludes and blocks this opening and prevents the matching geometric member 30 on the elongated rod or jackshaft 27 from moving out of the tubular socket or joint 24 until the safety bar 105 is moved away from its blocking position with respect to the outer or exterior end of the lower opening 25b of the tubular socket or joint 24.

Thus, when the blind person using this alternate dog guide harness desires to modify the position of the handle assembly 19, it is necessary to manually press the push rod 104 to move safety bar 105 from its blocking position. After this is done, the dog guide harness 100 operates and can be repositioned in exactly the same manner as above described for the form of the invention shown in FIGS. 1 to 6 of the drawings.

It will be understood that the invention is not to be limited to the specific construction or arrangement of parts shown but that they may be widely modified within the invention defined by the claims as hereinafter set forth.

What is claimed is:

1. A dog guide harness for a dog guide comprising:
   a. a harness frame including, means for adjustably mounting the harness frame to the dog guide, and
   b. a handle assembly, including a self-locking linking means for fixedly, pivotally and rotatably connecting the handle assembly to said harness frame to enable said handle assembly to be alternatively and selectively pivoted along the longitudinal line and rotated between at least a first fixed position and a second fixed position relative the longitudinal line of said dog guide harness.

2. The dog guide harness in claim 1, including, a shaft means rotatably mounted in the harness frame, said self-locking linking means fixedly connecting the handle assembly to said rotatable shaft for pivotal movement in the longitudinal line of the dog guide harness, and means operatively connected to the handle assembly for limiting the pivotal movement of the handle assembly.

3. The dog guide harness as in claim 2 wherein the means for limiting the pivotal movement of the handle assembly includes, a stop member fixedly connected to and rotatable with the rotatable shaft having a predetermined length and disposed at a predetermined angle, and means on the harness frame forming a stop to limit the rotational movement of the stop member.

4. The dog guide harness as in claim 2 wherein said self-locking linking means includes:
   a. a tubular socket rigidly connected to the harness frame,
   b. a coacting elongated rod member slidably disposed in said tubular socket, c. said rod member rigidly connected at one end to said handle assembly, d. means between the rod member and the tubular socket for releasably fixing the rod member in said tubular socket, in a at least one engaged position, and e. resilient means disposed between the rod member and the tubular socket to enable the handle assemble to be moved from the at least one engaged position and rotated to another engaged position.

5. The dog guide harness as in claim 4 wherein:

a. said tubular socket has, a closed upper end with a bearing opening therein to enable said rod member to be slidably mounted in said tubular socket, a lower open end remote from said closed end, and an inner wall, b. the means between the rod member and the tubular socket for releasably fixing the rod member in said tubular socket in at least one engaged position includes:

i. a predetermined geometric shape on the inner wall of said tubular socket adjacent the lower open end, and ii. a predetermined geometric shape on the end of the rod member disposed in the tubular socket to match the predetermined geometric shape on the inner wall of the tubular socket for releasable engagement of these shapes on rotation of the handle assembly.

6. The dog guide harness as in claim 1 wherein said self-locking linking means includes:

a. a tubular socket rigidly connected to the harness frame, b. a coacting elongated rod member slidably disposed in said tubular socket, c. said rod member rigidly connected at one end to said handle assembly, d. means between the rod member and the tubular socket for releasably fixing the rod member in said tubular socket in a at least one engaged position, and e. a resilient member disposed between the rod member and the tubular socket to enable the handle assemble to be moved from the at least one engaged position and rotated to another engaged position.

7. The dog guide harness as in claim 6 herein:

a. said tubular socket has, a closed upper end with a bearing opening therein to enable said rod member to be slidably mounted in said tubular socket, a lower open end remote from said closed end, and an inner wall, b. the means between the rod member and the tubular socket for releasably fixing the rod member in said tubular socket in a at least one engaged position includes:

i. a predetermined geometric shape on the inner wall of said tubular socket adjacent the lower open end, and ii. a predetermined geometric shape on the end of the rod member disposed in the tubular socket to match the predetermined geometric shape on the inner wall of the tubular socket for releasable engagement of these shapes on rotation of the handle assembly.

8. The dog guide harness in claims 6 or 4 wherein the resilient member is a coil type spring disposed to fit about the tubular socket and the rod member and for engagement at one end with the closed end of the tubular socket and at the opposite with the handle assembly.

9. A dog guide harness comprising:

a. a harness frame, b. a handle assembly having, a self-locking linking means for rigidly, pivotally and rotatably connecting the handle assembly to the harness frame, c. said harness frame including, i. a shaft rotatably mounted in the harness frame, ii. a stop member fixedly connected and rotatable with the shaft, and iii. stop means on the harness frame for operative engagement with the stop member to limit the pivotal movement of said handle assembly.

10. A dog guide harness for a dog guide comprising:

a. a harness frame including, means for adjustably mounting the harness frame to the dog guide, b. a handle assembly, including a self-locking linking means for fixedly, pivotally and rotatably connecting the handle assembly to said harness frame to enable said handle assembly to be alternatively and selectively pivoted along the longitudinal line and rotated between at least a first fixed position and a second fixed position relative the longitudinal line of said dog guide harness, c. said linking means including, a tubular socket rigidly connected to the harness frame, a coating elongated rod member slidably disposed in said tubular socket and rigidly connected to the handle assembly, and a resilient member to normally maintain the tubular socket and rod member in coacting engaged relationship and for permitting repositioning of the handle assembly, and d. a safety assembly disposed for operative engagement with the linking means to prevent inadvertent and to allow required separation of the tubular socket and the rod member during use of the dog guide harness or for repositioning of the handle assembly.

11. A dog guide harness comprising:

a. a harness frame having at least two spaced apart support arms, b. a support shaft rotatably mounted between said support arms, c. a stop member fixedly connected and moveable with said rotatable support shaft and a stop on said harness frame opposing said stop member whereby the extent of the rotation of said rotatable support shaft is limited;

d. a handle assembly with a linking means for rigidly, pivotally and rotatably connecting said handle assembly to said rotatable support shaft;

e. said linking means including, i. tubular socket with a predetermined geometric shaped inner wall adjacent the lower opening at one end of said tubular socket, ii. an elongated rod member slidably mounted in the tubular socket having a predetermined geometric shape at the end disposed in said tubular socket for matching engagement with the geometric shaped inner wall of the tubular socket and the opposite end exterior of the tubular socket fixedly connected to said handle assembly, iii. a resilient member for normally maintaining the tubular socket and the rod member in engagement with each other, and f. said rod member alternative and selectively movable and rotatable relative the tubular socket from an engaged first position with said predetermined geometric inner wall to at least one other engaged position with said predetermined geometric inner wall whereby said handle assembly is rotatable therewith.

* * * * *

UNITED STATES PATENT AND TRADEMARK OFFICE
CERTIFICATE OF CORRECTION

PATENT NO.    : 6,408,799 B1
DATED         : June 25, 2002
INVENTOR(S)   : Lukas Franck It is certified that error appears in the above-identified patent and that said Letters Patent is hereby corrected as shown below:

<u>Column 7,</u>
Line 6, "resilient means" should read -- a resilient member --.

Signed and Sealed this

Twenty-first Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,408,799 B1
DATED : June 25, 2002
INVENTOR(S) : Lukas Franck

It is certified that error appears in the above-identified patent and that said Letters Patent is hereby corrected as shown below:

Column 6,
Line 51, cancel the word "means".
Line 63, "2" should read -- 1 --.

Column 7,
Line 49, cancel the word "a".

Signed and Sealed this

First Day of April, 2003

JAMES E. ROGAN
*Director of the United States Patent and Trademark Office*